US006988030B2

(12) United States Patent
Asano et al.

(10) Patent No.: US 6,988,030 B2
(45) Date of Patent: Jan. 17, 2006

(54) INJECTION CONTROL SYSTEM OF INTERNAL COMBUSTION ENGINE

(75) Inventors: Masahiro Asano, Kariya (JP); Eiji Takemoto, Obu (JP); Hiroshi Haraguchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/990,987

(22) Filed: Nov. 18, 2004

(65) Prior Publication Data

US 2005/0109322 A1 May 26, 2005

(30) Foreign Application Priority Data

Nov. 21, 2003 (JP) ............................ 2003-392114

(51) Int. Cl.
*B60T 7/12* (2006.01)

(52) U.S. Cl. ...................... 701/103; 701/104; 701/111; 123/436; 123/478

(58) Field of Classification Search ................ 123/103, 123/104, 105, 111, 115, 436, 478, 480
See application file for complete search history.

(56) References Cited

U.S. PATENT DOCUMENTS 4,800,857 A * 1/1989 Tomisawa ................... 123/674
4,854,287 A * 8/1989 Tomisawa ................... 123/675
4,881,505 A * 11/1989 Tomisawa ................... 123/480
5,381,767 A * 1/1995 Kikuchi ................. 123/339.15
6,244,241 B1 * 6/2001 Mamiya et al. ............. 123/295
2003/0164166 A1 * 9/2003 Takeuchi et al. ............ 123/674
2004/0267433 A1 12/2004 Asano et al.
2004/0267434 A1 * 12/2004 Asano et al. ............... 701/104

FOREIGN PATENT DOCUMENTS

JP 2003-185633 7/2003

* cited by examiner

*Primary Examiner*—John T. Kwon
(74) *Attorney, Agent, or Firm*—Nixon & Vanderhye P.C.

(57) ABSTRACT

An electronic control unit (ECU) of an engine calculates a first modification value for decreasing a correction value of an injection period when a state variation of the engine caused by a single injection is greater than a target value. The ECU calculates a second modification value for increasing the correction value when the state variation is less than the target value. The second modification value is greater than the first modification value. Thus, a period necessary to converge the correction value can be shortened when the correction value is increased. The first modification value is increased if a difference between the state variation and the target value exceeds a permissible value when the correction value is decreased. Thus, the injection quantity is decreased quickly to prevent excessive fuel injection.

8 Claims, 6 Drawing Sheets

INJECTION CONTROL SYSTEM OF INTERNAL COMBUSTION ENGINE

CROSS REFERENCE TO RELATED APPLICATION

This application is based on and incorporates herein by reference Japanese Patent Application No. 2003-392114 filed on Nov. 21, 2003.

BACKGROUND OF THE INVENTION

1. Field of the Invention

The present invention relates to an injection control system of an internal combustion engine for performing an injection quantity learning operation.

2. Description of Related Art

As a method of inhibiting generation of combustion noise and nitrogen oxides in a diesel engine, a method of performing a pilot injection for injecting a very small quantity of fuel before a main injection is known. Since a command value of the pilot injection quantity is small, improvement of accuracy of the small quantity injection is necessary to sufficiently exert the effects of the pilot injection of inhibiting the generation of the combustion noise and the nitrogen oxides. Therefore, an injection quantity learning operation for measuring a deviation between the command injection quantity of the pilot injection and a quantity of actually injected fuel (an actual injection quantity) and for correcting the injection quantity on a software side is necessary.

A fuel injection control system disclosed in Japanese Patent Application No. 2003-185633 can perform the injection quantity learning operation highly accurately. The control system performs a single injection from an injector into a specific cylinder of an engine when the engine is in a no-injection state, in which a command injection quantity outputted to the injector is zero or under. The engine is brought to the no-injection state if fuel supply is cut when a position of a shift lever is changed or when a vehicle is decelerated, for instance. The control system calculates an actual injection quantity based on a variation of an engine rotation speed caused by the single injection. If an error is generated between the actual injection quantity and the command injection quantity of the pilot injection, the control system corrects the command injection quantity in accordance with the error.

Usually, the command injection quantity is corrected by calculating an injection period correction value from a characteristic shown in FIG. 8 based on the difference between the actual injection quantity measured by performing the single injection and the command injection quantity. In FIG. 8, ΔT represents the correction value of the injection period, ΔN is the variation in the operating state of the engine (an engine state variation ΔN), and Ntrg is a target value of the engine state variation ΔN. For instance, the engine state variation ΔN is a variation (an increase) in the rotation speed of the engine caused by the single injection. This characteristic shown in FIG. 8 aims to shorten a period necessary to complete the correction by increasing the correction value ΔT as the deviation between the command injection quantity and the actual injection quantity increases. The engine state variation ΔN corresponds to the actual injection quantity and the target value Ntrg corresponds to the command injection quantity. However, it takes a much longer time to find the correction value ΔT for compensating for the deviation in the case where the actual injection quantity largely deviates from the command injection quantity along a decreasing direction than in the case where the actual injection quantity deviates along an increasing direction, as explained below.

Characteristics of an injector of a diesel engine are shown in FIG. 9. In FIG. 9, Q represents the actual injection quantity, Qc is the command injection quantity, and TQ is the injection period. If the actual injection quantity Q largely deviates along the decreasing direction from a solid line q1 to a broken line q2 shown in FIG. 9, a no-injection range, in which the actual injection quantity Q is zero, is enlarged from a range A1 to a range A2 shown in FIG. 9. Meanwhile, a characteristic of the engine state variation ΔN changes from a solid line n1 to a broken line n2 shown in FIG. 9. At that time, if a first injection is performed based on a first injection pulse width TQ1 shown in FIG. 9, the injector injects no fuel and a variation of the engine rotation speed (the engine state variation ΔN) due to the injection is not generated. In this state, a value provided by subtracting the actual injection quantity Q from the command injection quantity Qc coincides with the command injection quantity Qc, since the actual injection quantity Q is zero. In such a case, if the injection period correction value ΔT is calculated by the above method, a value "a" shown in FIG. 8 or 9 is calculated as the injection period correction value ΔT.

If a second single injection is performed based on an injection pulse width TQ2 shown in FIG. 9, in which the correction value "a" is reflected, no fuel is injected. Accordingly, the correction value remains "a".

Thus, in the case where the actual injection quantity Q deviates largely along the decreasing direction and the actual injection quantity Q provided after the correction remains zero, the constant correction value is calculated regardless of the degree of the deviation of the characteristic of the injector. Therefore, the effect of shortening the period necessary to complete the correction by increasing the correction value as the deviation increases cannot be achieved. As a result, the correction takes a long time.

If the actual injection quantity Q deviates largely along the increasing direction from the command injection quantity Qc, the single injection quantity injected for the injection quantity learning operation will increase excessively. If the injection is continued at the command injection quantity, noise will be generated and emission will be deteriorated.

SUMMARY OF THE INVENTION

It is therefore an object of the present invention to provide an injection control system of an internal combustion engine capable of shortening a period to complete a correction and of preventing noise generation and emission deterioration, which will be caused if an excessive quantity of fuel is injected in an injection quantity learning operation.

According to an aspect of the present invention, an injection control system of an internal combustion engine includes determining means, commanding means, measuring means, calculating means, and correcting means. The determining means determines whether a learning condition for performing an injection quantity learning operation is established. The commanding means commands an injector to perform a single injection into a specific cylinder of the engine when the learning condition is established. The measuring means measures a state variation of the engine caused by performing the single injection. The calculating means calculates a correction value for increasing or decreasing a command injection quantity corresponding to the single injection, based on the state variation of the engine. The correcting means corrects the command injection quantity by increasing or decreasing the command injection quantity in accordance with the correction value. The calculating means sets at least one of a modification value for modifying the correction value and a modification speed, at which the correction value is modified, to a greater value in the case where the command injection quantity is increased in the correction than in the case where the command injection quantity is decreased in the correction.

When an actual injection quantity is very small, there is a possibility that the injection quantity remains zero even if the injection quantity is corrected and renewed. In such a case, it takes a long time to obtain a desired correction value. In contrast, according to the present invention, the calculating means sets at least one of the modification value and the modification speed to a greater value in the case where the command injection quantity is increased in the correction than in the case where the command injection quantity is decreased in the correction. Therefore, the period for converging the correction value can be shortened.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS

First Embodiment

Figure 1:
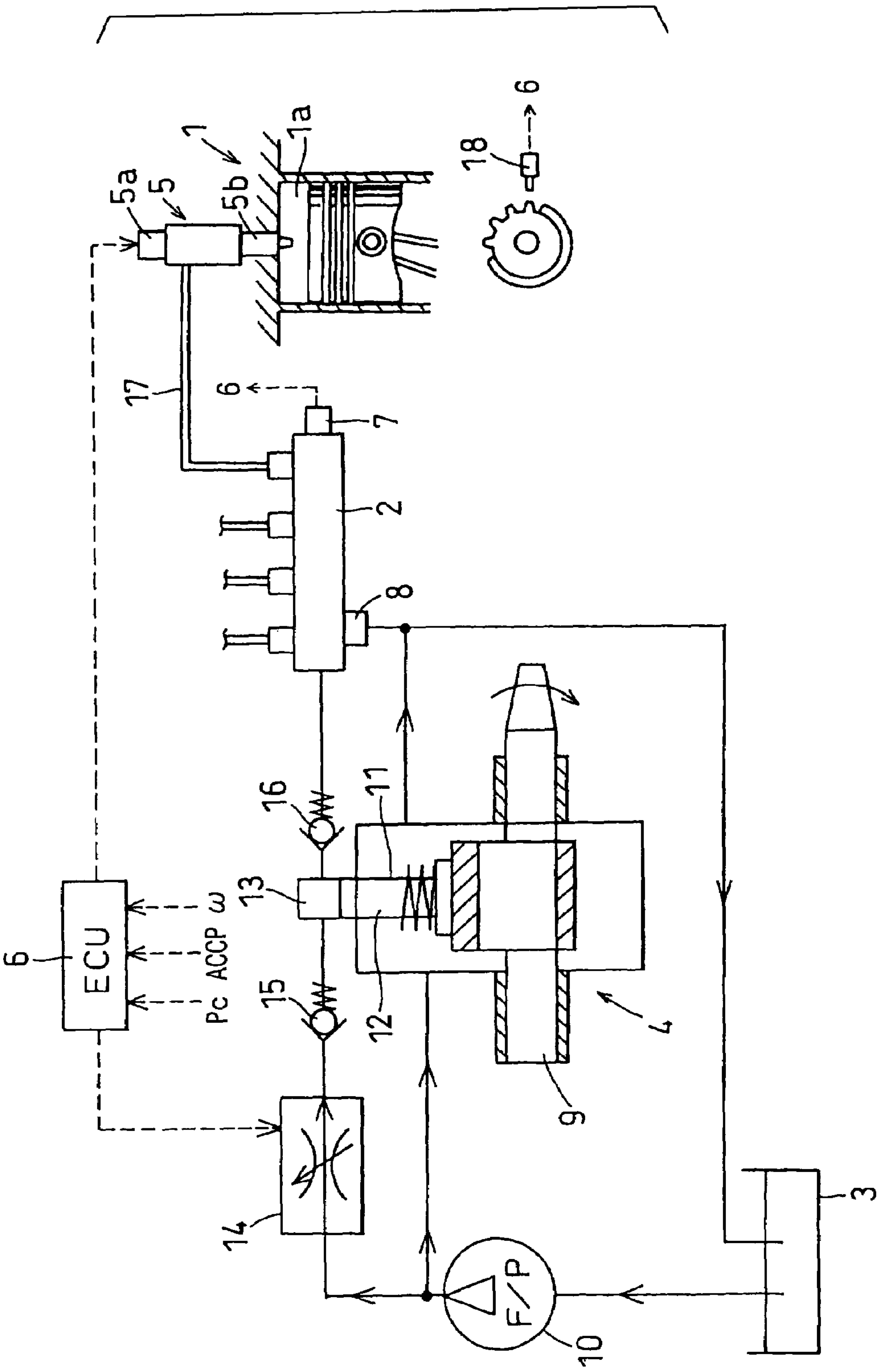
FIG. 1 is a schematic diagram showing a control system of a diesel engine according to a first embodiment of the present invention.

Referring to FIG. 1, an injection control system of a four-cylinder diesel engine 1 according to a first embodiment of the present invention is illustrated. As shown in FIG. 1, the engine 1 of the present embodiment includes an accumulation type fuel injection system.

As shown in FIG. 1, the fuel injection system includes a common rail 2, a fuel pump 4, injectors 5 and an electronic control unit (ECU) 6. The common rail 2 accumulates high-pressure fuel. The fuel pump 4 pressurizes fuel drawn from a fuel tank 3 and pressure-feeds the fuel to the common rail 2. The injectors 5 inject the high-pressure fuel, which is supplied from the common rail 2, into cylinders (combustion chambers 1*a*) of the engine 1. The ECU 6 electronically controls the system.

The ECU 6 sets a target value of a rail pressure Pc of the common rail 2 (a pressure of the fuel accumulated in the common rail 2). The common rail 2 accumulates the high-pressure fuel, which is supplied from the fuel pump 4, to the target value of the rail pressure Pc. A pressure sensor 7 and a pressure limiter 8 are attached to the common rail 2. The pressure sensor 7 senses the rail pressure Pc and outputs the rail pressure Pc to the ECU 6. The pressure limiter 8 limits the rail pressure Pc so that the rail pressure Pc does not exceed a predetermined upper limit value.

The fuel pump 4 has a camshaft 9, a feed pump 10, a plunger 12 and an electromagnetic flow control value 14. The camshaft 9 is driven and rotated by the engine 1. The feed pump 10 is driven by the camshaft 9 and draws the fuel from the fuel tank 3. The plunger 12 reciprocates in a cylinder 11 in synchronization with the rotation of the camshaft 9. The electromagnetic flow control valve 14 regulates a quantity of the fuel introduced from the feed pump 10 into a pressurizing chamber 13 provided inside the cylinder 11.

In the fuel pump 4, when the plunger 12 moves from a top dead center to a bottom dead center in the cylinder 11, the quantity of the fuel discharged from the feed pump 10 is regulated by the electromagnetic flow control valve 14, and the fuel opens a suction valve 15 and is drawn into the pressurizing chamber 13. Then, when the plunger 12 moves from the bottom dead center to the top dead center in the cylinder 11, the plunger 12 pressurizes the fuel in the pressurizing chamber 13. Thus, the fuel opens a discharge valve 16 from the pressurizing chamber 13 side and is pressure-fed to the common rail 2.

The injectors 5 are mounted to the respective cylinders of the engine 1 and are connected to the common rail 2 through high-pressure pipes 17. Each injector 5 has an electromagnetic valve 5*a*, which operates responsive to a command outputted from the ECU 6, and a nozzle 5*b*, which injects the fuel when the electromagnetic valve 5*a* is energized.

The electromagnetic valve 5*a* opens and closes a low-pressure passage leading from a pressure chamber, into which the high-pressure fuel in the common rail 2 is supplied, to a low-pressure side. The electromagnetic valve 5*a* opens the low-pressure passage when energized, and closes the low-pressure passage when deenergized.

The nozzle 5*b* incorporates a needle for opening or closing an injection hole. The pressure of the fuel in the pressure chamber biases the needle in a valve closing direction (a direction for closing the injection hole). If the electromagnetic valve 5*a* is energized and opens the low-pressure passage, the fuel pressure in the pressure chamber decreases, and the needle ascends in the nozzle 5*b* and opens the injection hole. Thus, the nozzle 5*b* injects the high-pressure fuel, which is supplied from the common rail 2, through the injection hole. If the electromagnetic valve 5*a* is deenergized and closes the low-pressure passage, the fuel pressure in the pressure chamber increases. Accordingly, the needle descends in the nozzle 5*b* and closes the injection hole. Thus, the injection is ended.

The ECU 6 is connected with a rotation speed sensor 18 for sensing an engine rotation speed (a rotation number per minute) ω, an accelerator position sensor for sensing an accelerator position (a load of the engine 1) ACCP and the pressure sensor 7 for sensing the rail pressure Pc. The ECU 6 calculates the target value of the rail pressure Pc of the common rail 2, and injection timing and an injection quantity suitable for an operating state of the engine 1, based on information sensed by the above sensors. The ECU 6 electronically controls the electromagnetic flow control valve 14 of the fuel pump 4 and the electromagnetic valves 5*a* of the injectors 5 based on the results of the calculation.

In order to improve accuracy of a small quantity injection such as a pilot injection performed before a main injection, the ECU 6 performs an injection quantity learning operation explained below.

In the injection quantity learning operation, an error between a command injection quantity corresponding to the pilot injection and a quantity (an actual injection quantity) of the fuel actually injected by the injector 5 responsive to the command injection quantity (an injection command pulse) is measured. Then, the command injection quantity is corrected in accordance with the error.

Figure 2:
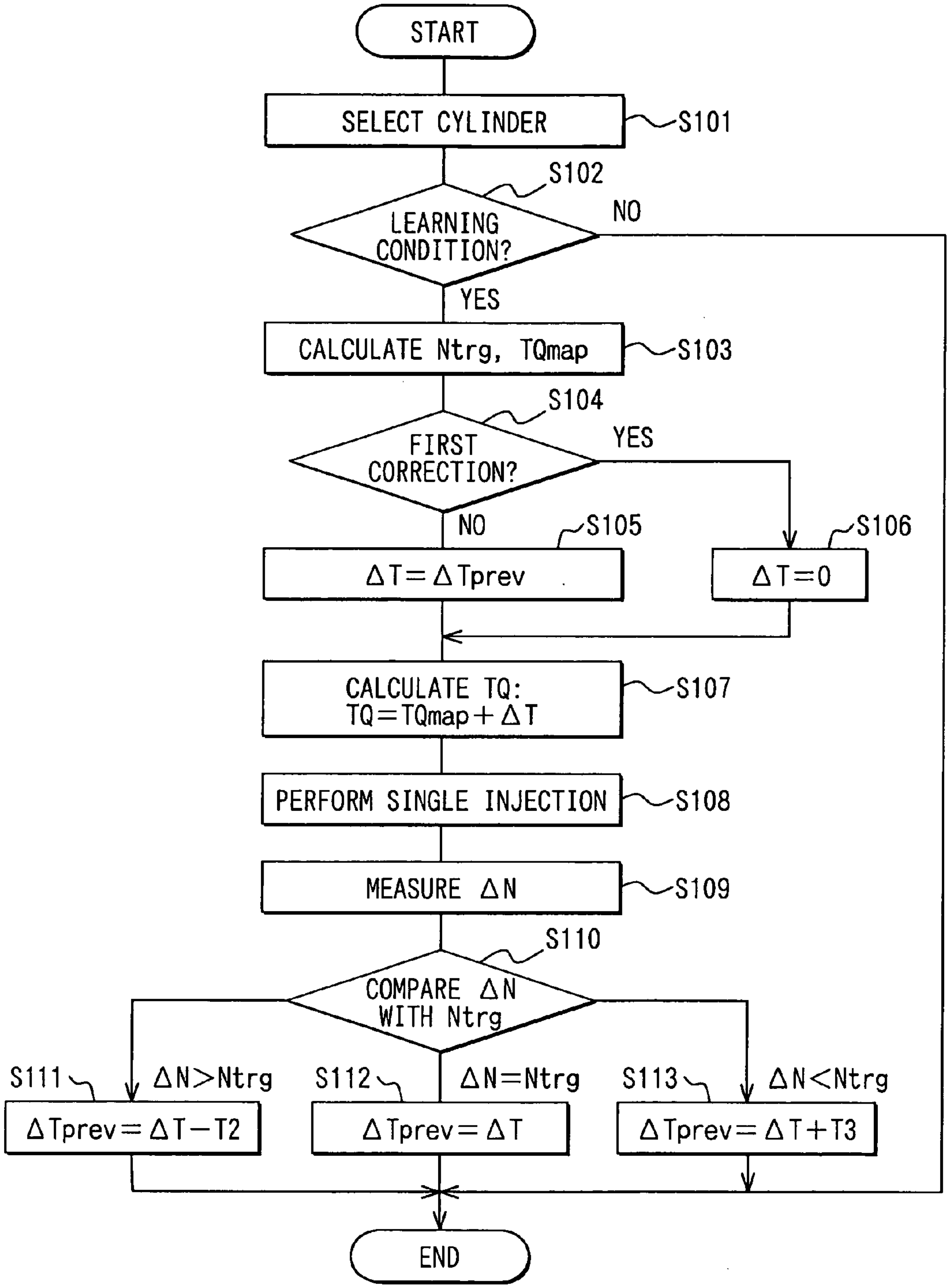
FIG. 2 is a flowchart showing processing steps of an injection quantity learning operation performed by an ECU of the control system according to the first embodiment.

Next, processing steps of the injection quantity learning operation performed by the ECU 6 according to the first embodiment will be explained based on a flowchart shown in FIG. 2.

First, in Step S101, a cylinder for performing a single injection for the injection quantity learning operation is selected. More specifically, the cylinder for performing the injection quantity learning operation is selected based on a state of the correction (the injection quantity learning operation) performed before the present learning operation. If the present learning operation is the first one, a predetermined cylinder is selected or an arbitrary cylinder is selected.

Then, in Step S102, it is determined whether a learning condition for performing the single injection into the selected cylinder is established. The learning condition is established at least when the engine 1 is in a no-injection state, in which the command injection quantity outputted to the injector 5 is zero or under, and a predetermined rail pressure is maintained. The engine 1 is brought to the no-injection state if fuel supply is cut when a position of a shift lever is changed or when a vehicle is decelerated, for instance. If the result of the determination in Step S102 is "YES", the processing proceeds to Step S103. If the result of the determination in Step S102 is "NO", the processing is ended.

In Step S103, a basic energization period TQmap of the injection command pulse outputted to the injector 5 and a target value Ntrg of an engine state variation ΔN are calculated based on an injection quantity and an injection pressure (the rail pressure Pc) in an injection range in which the learning operation is required. The basic energization period TQmap can be calculated based on an injection pulse map, in which the basic energization period TQmap is matched with each injection quantity in advance. The engine state variation ΔN is a variation (an increase) in the engine rotation speed ω caused by the single injection, for instance. The target value Ntrg of the engine state variation ΔN can be calculated from a rotation speed variation map, in which the target value Ntrg is matched with each injection quantity in advance.

In Step S104, it is determined whether the present correction is the first one. If the result of the determination in Step S104 is "NO", the processing proceeds to Step S105. If the result of the determination in Step S104 is "YES", the processing proceeds to Step S106.

In Step S105, a correction value ΔTprev provided by the previous correction calculation is employed as a correction value ΔT.

In Step S106, the correction value ΔT is reset to zero (ΔT=0).

In Step S107, an injection period TQ of the injection for the learning operation is calculated based on the basic energization period TQmap calculated in Step S103 and the correction value ΔT calculated in Step S105 or Step S106.

In Step S108, the injection period TQ of the injection for the learning operation is outputted to the injector 5 to perform the single injection in the cylinder selected in Step S101.

In Step S109, the engine state variation ΔN caused by the single injection is measured.

In Step S110, the engine state variation ΔN is compared with the target value Ntrg. If the engine state variation ΔN is greater than the target value Ntrg, the processing proceeds to Step S111. If the engine state variation ΔN is equal to the target value Ntrg, the processing proceeds to Step S112. If the engine state variation ΔN is less than the target value Ntrg, the processing proceeds to Step S113.

Figure 3:
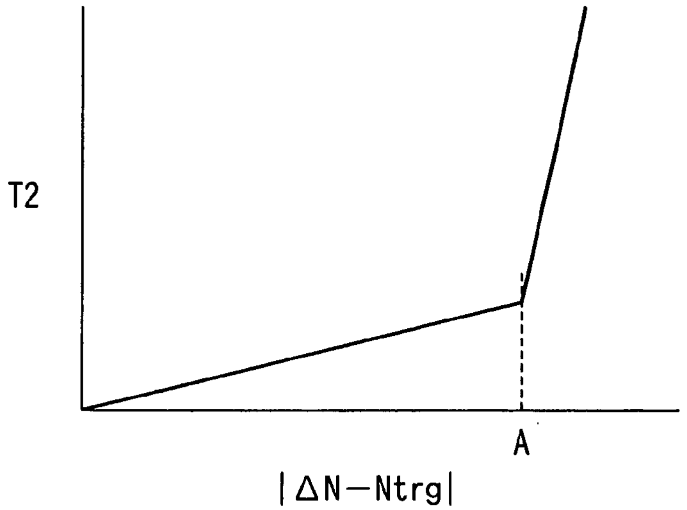
FIG. 3 is a correction map for calculating a modification value of an injection period according to the first embodiment.

In Step S111, a modification value T2 is calculated based on a correction map shown in FIG. 3 and the correction value ΔTprev is calculated by subtracting the modification value $T_2$ from the correction value ΔT calculated in Step S105 or Step S106.

In Step S112, the correction value ΔT calculated in Step S105 or Step S106 is employed as the correction value ΔTprev.

Figure 4:
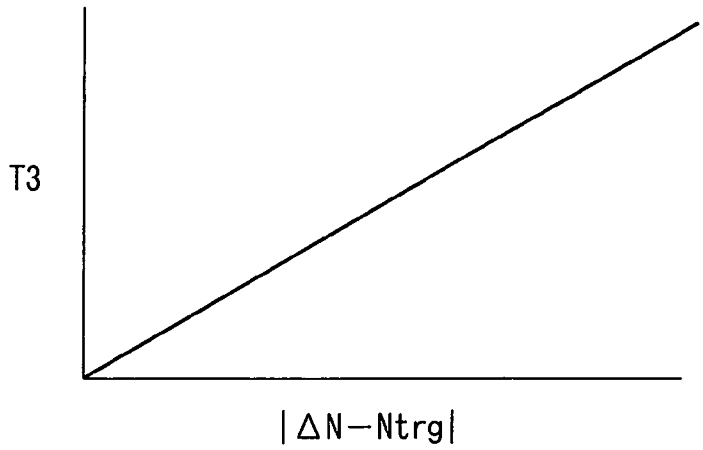
FIG. 4 is another correction map for calculating the modification value of the injection period according to the first embodiment.

In Step S113, a modification value $T_3$ is calculated based on a correction map shown in FIG. 4, and the correction value ΔTprev is calculated by adding the modification value T3 to the correction value ΔT calculated in Step S105 or Step S106.

The correction value ΔTprev calculated in Step S111, Step S112 or Step S113 is used in the next correction.

Next, the correction maps shown in FIGS. 3 and 4 will be explained.

The correction map shown in FIG. 3 is used to decrease the correction value ΔT when the engine state variation ΔN is greater than the target value Ntrg. The modification value $T_2$ increases as a difference (an absolute value) between the engine state variation ΔN and the target value Ntrg increases as shown in FIG. 3. If the engine state variation ΔN is very large, or if the actual injection quantity is very large, there is a possibility that the noise is generated or the emission is deteriorated. Therefore, if the difference between the engine state variation ΔN and the target value Ntrg exceeds a predetermined permissible value (a value "A" shown in FIG. 3), the modification value T2 is increased rapidly (or an inclination of the correction map is increased) so that the injection quantity (the correction value ΔT) can be decreased quickly.

The correction map shown in FIG. 4 is used to increase the correction value ΔT when the engine state variation ΔN is less than the target value Ntrg. The modification value T3 increases as the difference (the absolute value) between the engine state variation ΔN and the target value Ntrg increases as shown in FIG. 4. When the measured engine state variation ΔN is zero, the actual injection quantity is zero. In this case, there is a possibility that the injection quantity remains zero even if the injection quantity is corrected and renewed. Accordingly, it takes a long time to find the desired correction value ΔT. Therefore, the inclination of the correction map shown in FIG. 4, which is used to increase the correction value ΔT when the variation ΔN is less than the target value Ntrg, is greater than that of the correction map shown in FIG. 3 in a range where the difference between the engine state variation ΔN and the target value Ntrg is less than the permissible value "A". Thus, the modification value T3 is greater than the modification value T2 unless the difference between the engine state variation ΔN and the target value Ntrg exceeds the permissible value "A".

In the present embodiment, the modification value T3 used to increase the correction value ΔT is greater than the modification value T2 used to decrease the correction value ΔT. Therefore, the period necessary to converge the correction value ΔT can be shortened.

The inclination of the correction map used to decrease the correction value ΔT is increased so that the modification value T2 for decreasing the correction value ΔT is increased if the difference between the engine state variation ΔN and the target value Ntrg exceeds the permissible value "A". Thus, the generation of the noise or the deterioration of the emission due to the injection of the excessive quantity of the fuel can be minimized.

Second Embodiment

Next, an injection quantity learning operation performed by an ECU 6 according to a second embodiment of the present invention will be explained based on a flowchart shown in FIG. 5.

In the injection quantity learning operation according to the second embodiment, a modification speed of the injection period (a speed for modifying the injection period) is changed in accordance with a difference (an absolute value) between the engine state variation ΔN and the target value Ntrg.

The modification speed is associated with a learning data acquisition continuation number N. The learning data acquisition continuation number N is the number of times the ECU 6 continuously acquires the data based on a certain injection pulse width. As the ECU 6 acquires more data continuously based on the certain injection pulse width (or as the learning data acquisition continuation number N increases), time length of the injection quantity learning operation based on the certain injection pulse width extends and the modification speed of the injection period (the injection pulse width) is decreased.

The injection system has a characteristic that the injection quantity varies among injections. Therefore, in the case where the data acquisition is performed only once, it is difficult to determine whether the deviation between the engine state variation ΔN and the target value Ntrg is the variation among the injections or the variation due to a change with time.

Therefore, in the injection quantity learning operation of the second embodiment, in order to eliminate the variation among the injections, the learning data acquisition is performed multiple times based on the same injection pulse width TQ, and the acquired data are averaged to perform the correction. This number of times of the data acquisition based on the same injection pulse width is referred to as the learning data acquisition continuation number N.

Next, the injection quantity learning operation according to the second embodiment will be explained based on the flowchart shown in FIG. 5.

Steps from Step S201 to Step S204, and steps from Step S206 to Step S209 of the second embodiment are the same as the steps from Step S101 to Step S104 and the steps from Step S106 to Step S109 of the first embodiment respectively.

Figure 5:
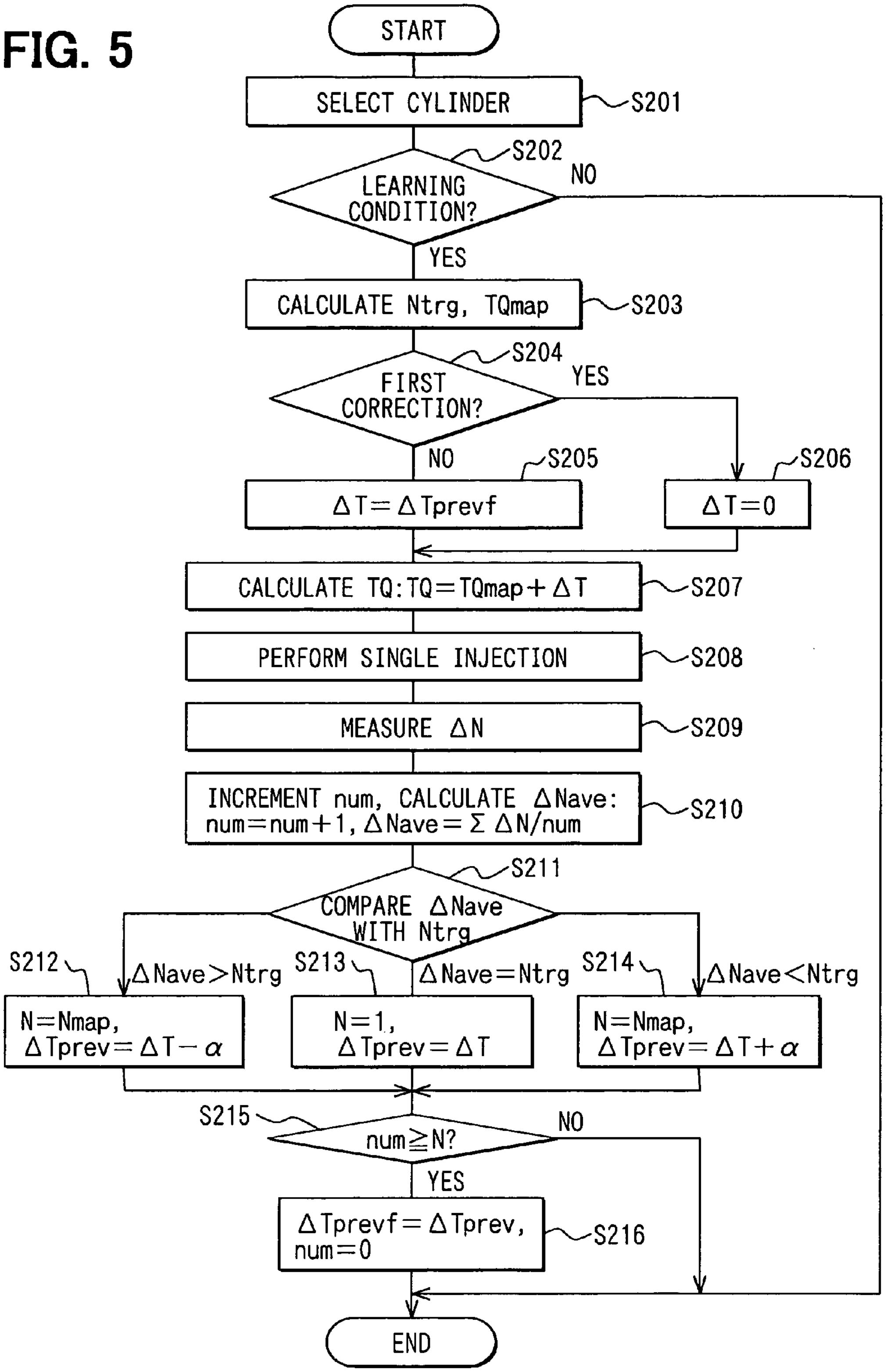
FIG. 5 is a flowchart showing processing steps of an injection quantity learning operation performed by an ECU of a control system according to a second embodiment of the present invention.

In Step S205 of the flowchart shown in FIG. 5, a previous correction value ΔTprevf calculated in the previous correction calculation is employed as a correction value ΔT (ΔT=ΔTprevf).

In Step S210, a learning data acquisition number counter "num" is incremented by one, and an average ΔNave of variations ΔN of the entire data measured in Step S209 is calculated. The number of the acquired data corresponds to the learning data acquisition number counter "num".

In Step S211, the averaged variation ΔNave is compared with a target value Ntrg. If the averaged variation ΔNave is greater than the target value Ntrg, the processing proceeds to Step S212. If the averaged variation ΔNave is equal to the target value Ntrg, the processing proceeds to Step S213. If the averaged variation ΔNave is less than the target value Ntrg, the processing proceeds to Step S214.

Figure 6:
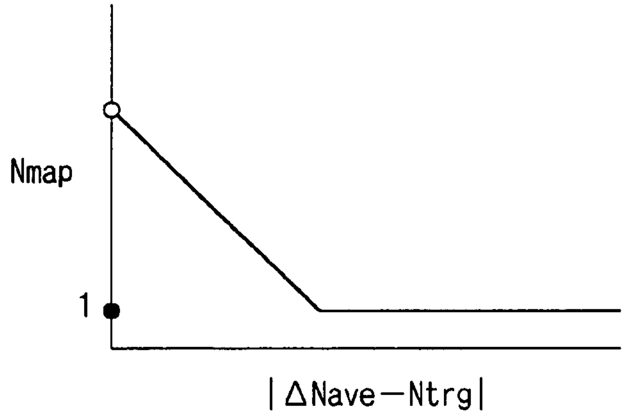
FIG. 6 is a map for calculating a learning data acquisition continuation number according to the second embodiment.

In Step S212, the learning data acquisition continuation number N is calculated based on a correction map shown in FIG. 6 (N=Nmap), and a correction value ΔTprev is calculated by subtracting a specified value α (α>0) from the correction value ΔT calculated in Step S205 or Step S206 (ΔTprev=ΔT−a).

In Step S213, the learning data acquisition continuation number N is set at one (N=1), and the present correction value ΔT is employed as the correction value ΔTprev.

Figure 7:
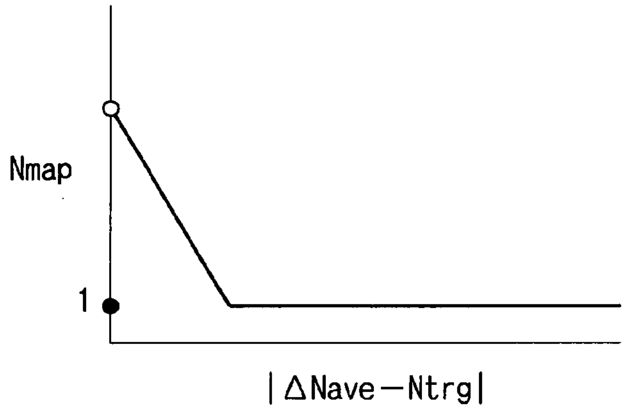
FIG. 7 is another map for calculating the learning data acquisition continuation number according to the second embodiment.
Figure 8:
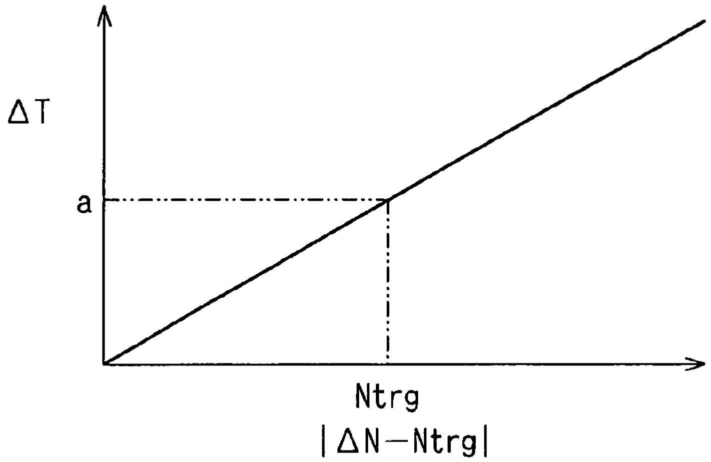
FIG. 8 RELATED ART
FIG. 8 is a map for calculating a correction value of an injection period of a related art.
Figure 9:
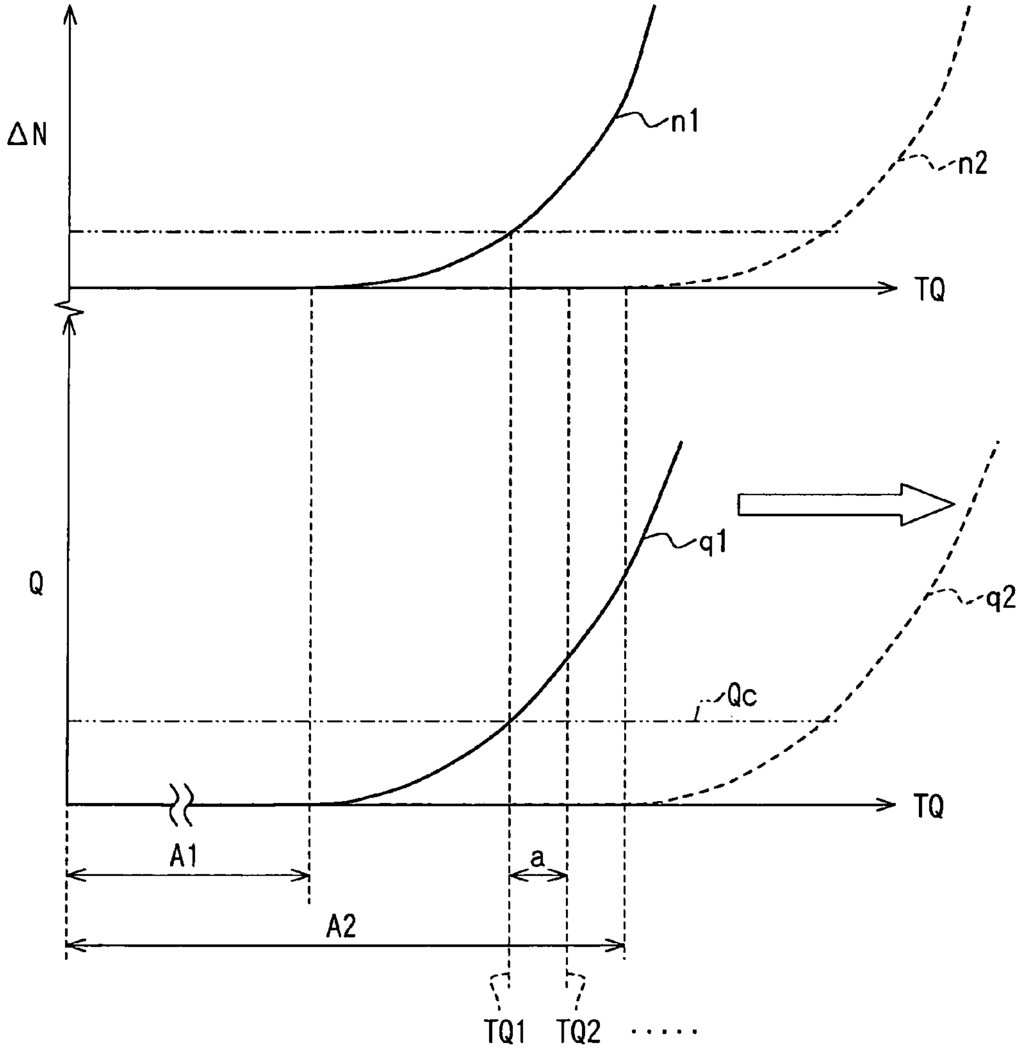
FIG. 9 RELATED ART
FIG. 9 is an injection characteristic map of an injector of the related art.

In Step S214, the learning data acquisition continuation number N is calculated based on a map shown in FIG. 7 (N=Nmap), and the correction value ΔTprev is calculated by adding the specified value α to the correction value ΔT calculated in Step S205 or Step S206 (×Tprev=ΔT+α).

In Step S215, it is determined whether the learning data acquisition number counter "num" is "equal to or greater than" the learning data acquisition continuation number N. If the result of the determination in Step S215 is "YES", the processing proceeds to Step S216. If the result of the determination in Step S215 is "NO", the data acquisition based on the same injection period TQ is repeated.

In Step S216, the correction value ΔTprev calculated in Step S212, Step S213 or Step S214 is employed as the correction value Tprevf used in the next correction, and the learning data acquisition number counter "num" is reset to zero (num=0).

Next, the correction maps shown in FIGS. 6 and 7 are explained.

The correction map shown in FIG. 6 or 7 is used to calculate the learning data acquisition continuation number N. The correction map shown in FIG. 6 is used when the averaged variation ΔNave is greater than the target value Ntrg. The correction map shown in FIG. 7 is used when the averaged variation ΔNave is less than the target value Ntrg.

Each one of the correction maps shown in FIGS. 6 and 7 decreases the learning data acquisition continuation number N and corrects the injection period TQ based on a small number of data when the difference between the averaged variation ΔNave and the target value Ntrg is large. If the difference between the averaged variation ΔNave and the target value Ntrg decreases, the learning date acquisition continuation number N is increased to eliminate the variation among the injections. Thus, it can be surely determined whether the averaged variation ΔNave corresponding to the present injection period TQ is greater than the target value Ntrg. If the learning data acquisition continuation number N is small when the difference between the averaged variation ΔNave and the target value Ntrg is small, it can be erroneously determined that the averaged variation ΔNave is less than the target value Ntrg because of the variation among the injections, even though the averaged variation ΔNave corresponding to the present injection period TQ is actually greater than the target value Ntrg. In this case, the correction will be performed erroneously.

The correction map shown in FIG. 7 has a wider range for increasing the modification speed of the injection period TQ (a wider range for providing a small learning data acquisition continuation number N) than the correction map shown in FIG. 6. When the averaged variation ΔNave is less than the target value Ntrg, the present injection period TQ is small, or the actual injection quantity is small. Specifically, in the case of the learning operation performed when the actual injection quantity is zero, it takes a long time to start the injection even if the injection period TQ is increased repeatedly by a predetermined amount. Accordingly, it takes a long time to complete the correction. Therefore, in the present embodiment, the range for increasing the modification speed of the injection period is widened when the actual injection quantity is small. Thus, the stable combustion range is reached quickly.

(Modifications)

By combining the first embodiment and the second embodiment, the modification value and the modification speed (the learning data acquisition continuation number N) of the injection period can be changed in accordance with the difference between the actual variation caused by the injection and the target value. This scheme can be realized by replacing the specified value α, which is used to modify the correction value ΔT of the injection period in Step S212 and Step S214 of the flowchart shown in FIG. 5, with the modification values T2, T2 shown in FIGS. 3 and 4.

The increase in the rotation speed ω is employed as the engine state variation ΔN in the first and second embodiments. Alternatively, an air fuel ratio, a cylinder pressure and the like can be employed as the engine state variation ΔN, instead of the increase in the rotation speed ω.

The present invention should not be limited to the disclosed embodiments, but may be implemented in many other ways without departing from the spirit of the invention.

What is claimed is:

1. An injection control system of an internal combustion engine, the injection control system comprising:

determining means for determining whether a learning condition for performing an injection quantity learning operation is established;

commanding means for commanding an injector to perform a single injection into a specific cylinder of the engine when the learning condition is established;

measuring means for measuring a state variation of the engine caused by performing the single injection;

calculating means for calculating a correction value for increasing or decreasing a command injection quantity of the single injection, which is outputted to the injector, based on the measured state variation of the engine; and correcting means for correcting the command injection quantity by increasing or decreasing the command injection quantity in accordance with the correction value, wherein the calculating means sets at least one of a modification value for modifying the correction value and a modification speed, at which the correction value is modified, to a greater value in the case where the command injection quantity is increased in the correction than in the case where the command injection quantity is decreased in the correction.

2. The injection control system as in claim 1, wherein the calculating means calculates a target value of the state variation of the engine based on the command injection quantity of the single injection and a difference between the target value and the measured state variation as an error, and calculates the modification value or the modification speed in accordance with the error.

3. The injection control system as in claim 1, wherein the calculating means calculates an actual injection quantity of the fuel actually injected in the single injection based on the measured state variation of the engine and a difference between the actual injection quantity and the command injection quantity of the single injection as an error, and calculates the modification value or the modification speed in accordance with the error.

4. The injection control system as in claim 1, wherein the calculating means calculates an actual injection pulse width corresponding to an actual injection quantity of the fuel actually injected in the single injection based on the measured state variation of the engine and a difference between the actual injection pulse width and a command injection pulse width corresponding to the command injection quantity of the single injection as an error, and calculates the modification value or the modification speed in accordance with the error.

5. The injection control system as in claim 2, wherein the calculating means sets at least one of the modification value and the modification speed to a greater value in the case where the error is greater than a predetermined permissible value than in the case where the error is less than the predetermined permissible value, when the command injection quantity is decreased in the correction.

6. The injection control system as in claim 3, wherein the calculating means sets at least one of the modification value and the modification speed to a greater value in the case where the error is greater than a predetermined permissible value than in the case where the error is less than the predetermined permissible value, when the command injection quantity is decreased in the correction.

7. The injection control system as in claim 4, wherein the calculating means sets at least one of the modification value and the modification speed to a greater value in the case where the error is greater than a predetermined permissible value than in the case where the error is less than the predetermined permissible value, when the command injection quantity is decreased in the correction.

8. The injection control system as in claim 1, wherein the learning condition is established at least when the engine is in a no-injection state, in which the command injection quantity outputted to the injector is zero or under.

* * * * *